(12) United States Patent
Karikomi et al.

(10) Patent No.: US 11,691,743 B2
(45) Date of Patent: Jul. 4, 2023

(54) PROPULSION DEVICE

(71) Applicant: MITSUBISHI HEAVY INDUSTRIES, LTD., Tokyo (JP)

(72) Inventors: Kai Karikomi, Tokyo (JP); Yuki Morisaki, Tokyo (JP); Kazuki Hosono, Tokyo (JP); Junji Iwatani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/568,106

(22) Filed: Jan. 4, 2022

(65) Prior Publication Data

US 2022/0219828 A1 Jul. 14, 2022

(30) Foreign Application Priority Data

Jan. 8, 2021 (JP) ................................ 2021-001959

(51) Int. Cl.
*F04D 25/06* (2006.01)
*B64D 27/24* (2006.01)

(52) U.S. Cl.
CPC .............. *B64D 27/24* (2013.01); *F04D 25/06* (2013.01)

(58) Field of Classification Search
CPC .......... B64D 27/24; F04D 25/06; F04D 25/08
See application file for complete search history.

(56) References Cited

U.S. PATENT DOCUMENTS

| | | | |
|---|---|---|---|
| 3,383,074 A * | 5/1968 | Coplin | ................ B64C 29/0033 244/55 |
| 2008/0042504 A1* | 2/2008 | Thibodeau | ............ F16C 39/063 310/90.5 |
| 2016/0023754 A1* | 1/2016 | Wiegand | ............. B64C 29/0025 244/17.11 |
| 2017/0203839 A1 | 7/2017 | Giannini et al. | |
| 2019/0283888 A1 | 9/2019 | Hines | |

FOREIGN PATENT DOCUMENTS

| | | |
|---|---|---|
| JP | 2019-501830 A | 1/2019 |
| WO | 2015/005776 A1 | 1/2015 |
| WO | 2020/227837 A1 | 11/2020 |

* cited by examiner

*Primary Examiner* — Thomas Fink
(74) *Attorney, Agent, or Firm* — Manabu Kanesaka; Benjamin Hauptman; Kenneth Berner

(57) ABSTRACT

A propulsion device includes: a duct in which a flow path extending in a direction of an axis; a fan which is provided with a) an outer peripheral ring formed in an annular shape surrounding the axis and installed to be relatively rotatable around the axis with respect to the duct, b) a plurality of fan blades arranged at intervals in a circumferential direction such that each blade is extended from the outer peripheral ring toward the inside of the flow path, and c) an inner peripheral ring formed in an annular shape being connected radially inner end portions of the plurality of fan blades and in which an air flow passage is formed so that air flows therethrough in the direction of the axis; and a motor which drives the fan to rotate around the axis.

3 Claims, 7 Drawing Sheets

PROPULSION DEVICE

BACKGROUND OF THE INVENTION

Field of the Invention

The present disclosure relates to a propulsion device.

Priority is claimed on Japanese Patent Application No. 2021-1959, filed Jan. 8, 2021, the content of which is incorporated herein by reference.

Description of Related Art

In recent years, aircrafts using ducted fans as propulsion devise are being put into practical use. As shown in Japanese Unexamined Patent Application Publication No. 2019-501830, for example, a ducted fan includes a tubular duct, a hub provided on a center axis of the duct, a motor built in the hub, and a plurality of fan blades extending radially from the hub. Air flow is generated from the front side toward the rear side of the duct by rotating the fan blades by the motor. An aircraft can make flights using the air flow as a source of a propulsion force.

SUMMARY

However, when the motor is built in the hub as described above, the hub can be a source of air resistance and reduce the propulsion force of the propulsion device. Further, since the hub is provided, the area (effective area) occupied by the fan blade when viewed from the front side decreases and hence the flow rate of air flowing around the fan blade decreases. As a result, there is a probability that the propulsion efficiency may decrease.

The present disclosure has been made to solve the above-described problems and an object thereof is to provide a propulsion device that further improves propulsion force and propulsion efficiency.

In order to solve the above-described problems, a propulsion device according to the present disclosure includes: a duct in which a flow path extending in a direction of an axis; a fan which is provided with a) an outer peripheral ring formed in an annular shape surrounding the axis and installed to be relatively rotatable around the axis with respect to the duct, b) a plurality of fan blades arranged at intervals in a circumferential direction such that each blade is extended from the outer peripheral ring toward the inside of the flow path, and c) an inner peripheral ring formed in a annular shape being connected radially inner end portions of the plurality of fan blades and in which an air flow passage is formed so that air flows therethrough in the direction of the axis; and a motor which is configured to drive the fan to rotate around the axis.

According to the present disclosure, it is possible to provide the propulsion device that further improves propulsion force and propulsion efficiency.

DETAILED DESCRIPTION

First Embodiment (Configuration of Propulsion Device)

Figure 2:
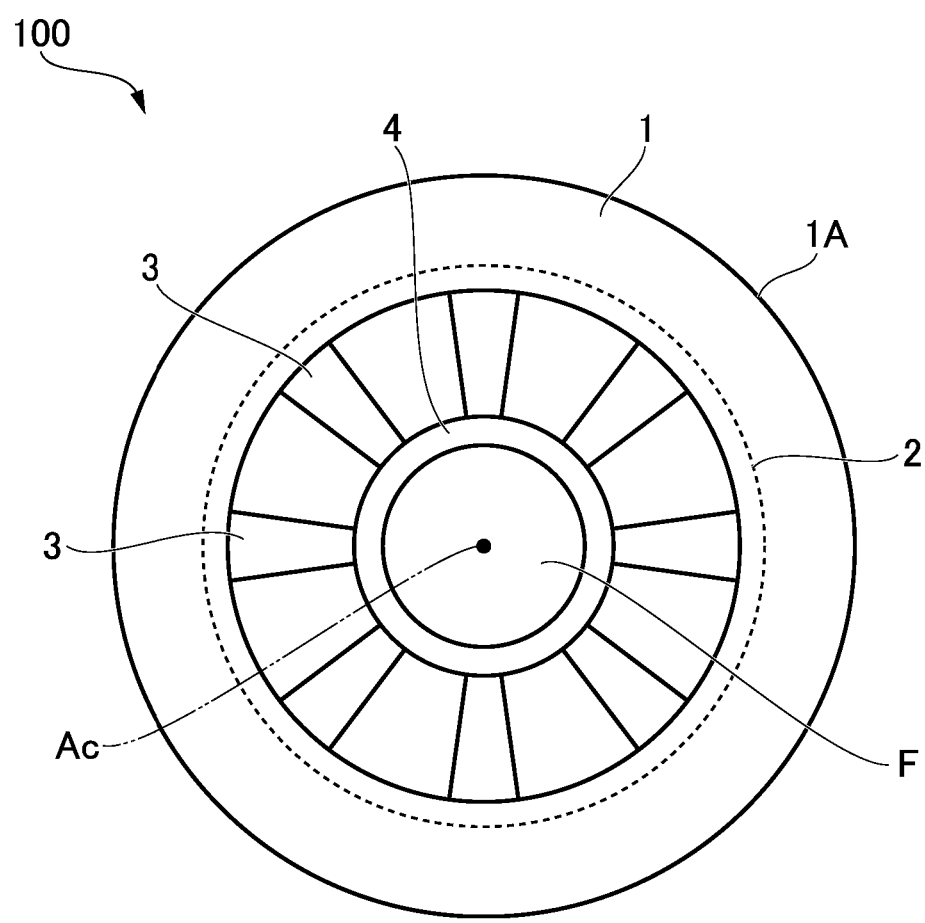
FIG. 2 is a diagram in which the propulsion device according to the first embodiment of the present disclosure is viewed from a front side.
Figure 3:
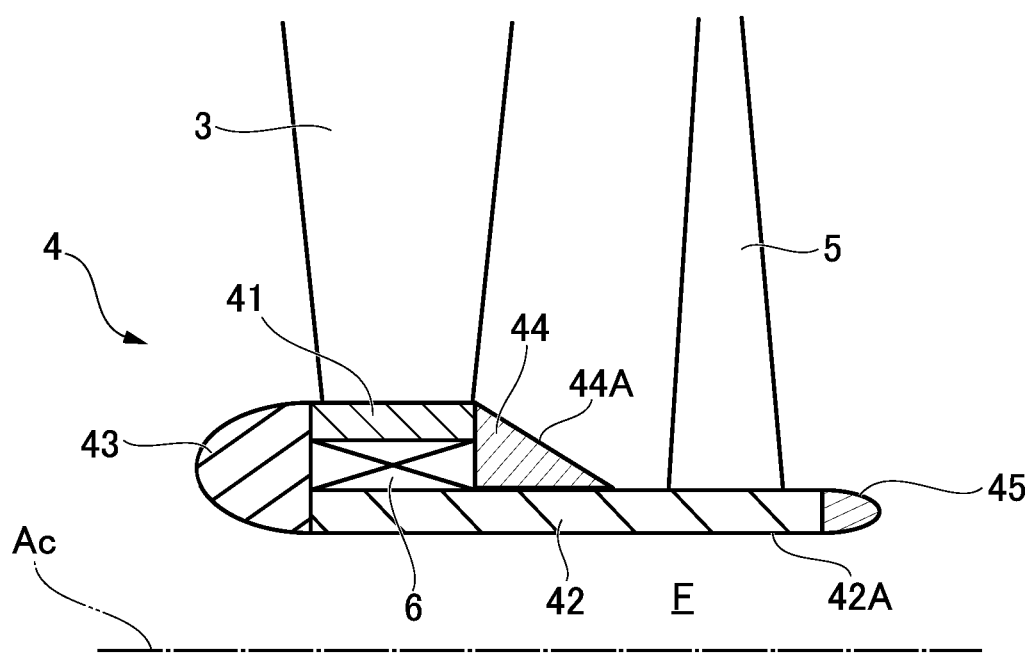
FIG. 3 is an enlarged cross-sectional view of a main part of the propulsion device according to the first embodiment of the present disclosure.

Hereinafter, a propulsion device 100 according to a first embodiment of the present disclosure will be described with reference to FIGS. 1 to 3. The propulsion device 100 is, for example, a device which is provided at one or a plurality of positions of an aircraft and gives a propulsion force to the aircraft.

Figure 1:
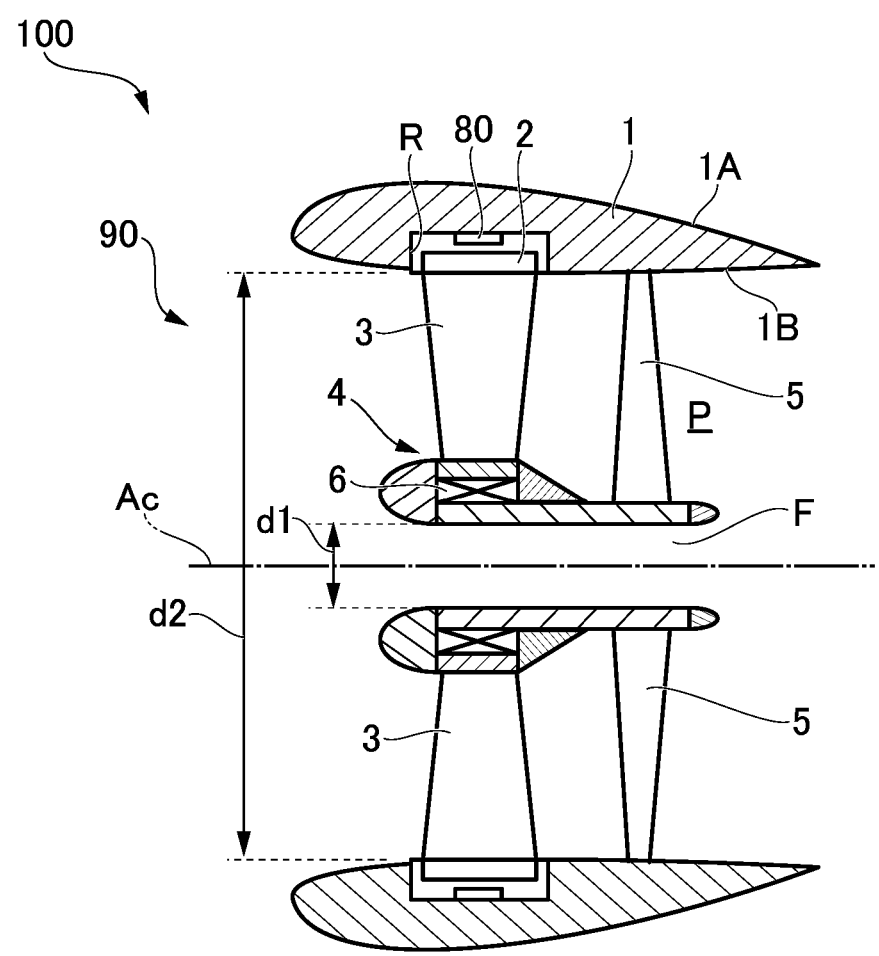
FIG. 1 is a cross-sectional view showing a configuration of a propulsion device according to a first embodiment of the present disclosure.

As shown in FIG. 1, the propulsion device 100 includes a fan 90 and a motor 80. The motor 80 rotationally drives a fan 90 by electric power supplied from the outside. The fan 90 includes a duct 1, an outer peripheral ring 2, a fan blade 3, an inner peripheral ring 4, a strut 5, and an inner bearing 6.

(Configuration of Duct)

The duct 1 is formed in a tubular shape centered on an axis Ac. Accordingly, a flow path P which extends in the direction of the axis Ac is formed inside the duct 1. An outer peripheral surface 1A of the duct 1 is curved in a curved shape that is convex outward in the radial direction with respect to the axis Ac. An inner peripheral surface 1B of the duct 1 is curved in a curved shape to be convex radially inward. In a cross-sectional view including the axis Ac, the inner peripheral surface 1B of the duct 1 is set to have a smaller peripheral edge length than the outer peripheral surface 1A. That is, the duct 1 has an airfoil cross-sectional shape.

The inner peripheral surface 1B of the duct 1 is provided with a concave portion R which is recessed radially outward. The concave portion R is an annular groove which is formed in a rectangular shape in a cross-sectional view including the axis Ac and spreads in the circumferential direction with respect to the axis Ac. The motor 80 is accommodated in the concave portion R. Although not shown in detail, the motor 80 includes a stator having a coil and a rotor having a magnet. In this embodiment, a coil is accommodated in the concave portion R to form a stator and a magnet is attached to the outer peripheral ring 2 to be described later to form a rotor.

(Configuration of Outer Peripheral Ring)

The outer peripheral ring 2 is formed in an annular shape surrounding the axis Ac. That is, the outer peripheral ring 2 is formed in a tubular shape centered on the axis Ac similarly to the duct 1. The outer peripheral ring 2 is accommodated in the concave portion R of the duct 1. The outer peripheral surface of the outer peripheral ring 2 is provided with the magnet. By energizing the coil, an electromagnetic force is generated between the coil and the magnet provided in the outer peripheral ring 2. This electromagnetic force applies a rotational force around the axis Ac to the outer peripheral ring 2. That is, the outer peripheral ring 2 is relatively rotatable with respect to the duct 1.

(Configuration of Fan Blade)

A plurality of fan blades 3 are provided on the inner peripheral side of the outer peripheral ring 2. As shown in FIG. 2, the plurality of fan blades 3 are arranged at intervals in the circumferential direction with respect to the axis Ac. In this embodiment, eight fan blades 3 are provided as an example. Additionally, the number of the fan blades 3 is not limited to eight and may be seven or less or nine or more. Each fan blade 3 extends from the inner peripheral surface of the outer peripheral ring 2 toward the radial inside (that is, the inside of the flow path P). The fan blade 3 has an airfoil cross-sectional shape when viewed from the radial direction. Thus, when the fan blade 3 is rotated around the axis Ac, an air flow is generated from a first side in the direction of the axis Ac corresponding to the front edge side of the fan blade 3 toward a second side (rear edge side). In the following description, the first side in the direction of the axis Ac is simply referred to as the "upstream side" and the second side is simply referred to as the "downstream side".

(Configuration of Inner Peripheral Ring)

The inner peripheral ring 4 is provided at the radially inner end portion of the fan blade 3. The inner peripheral ring 4 is formed in an annular shape centered on the axis Ac so that the radially inner end portions of the plurality of fan blades 3 are connected to each other. More specifically, as shown in FIG. 3, the inner peripheral ring 4 includes a movable ring 41, an inner peripheral ring body 42, a front end member 43, a cover 44, and a rear end member 45.

The movable ring 41 is formed in a tubular shape centered on the axis Ac. The radially inner end portion of the fan blade 3 is connected to the outer peripheral surface of the movable ring 41. The dimension of the movable ring 41 in the direction of the axis Ac is set to slightly larger than the dimension of the fan blade 3 in the direction of the axis Ac. Further, the radial dimension of the outer peripheral surface of the movable ring 41 is set to be constant over the entire area in the direction of the axis Ac.

The movable ring 41 is supported by the inner peripheral ring body 42 to be described later through the inner bearing 6. That is, the movable ring 41 is rotatable around the axis Ac. Additionally, a bearing device appropriately selected from known bearing devices such as a sliding bearing and a rolling bearing can be applied as the inner bearing 6.

The inner peripheral ring body 42 is provided on the radial inside of the movable ring 41. The inner peripheral ring body 42 is formed in a tubular shape centered on the axis Ac similarly to the movable ring 41. The inner bearing 6 is attached to the outer peripheral surface of the inner peripheral ring body 42. The dimension of the inner peripheral ring body 42 in the direction of the axis Ac is set to larger than the dimension of the movable ring 41 in the direction of the axis Ac.

The upstream end portion of the inner peripheral ring body 42 and the upstream end portion of the movable ring 41 are located at the same position in the direction of the axis Ac. That is, the inner peripheral ring body 42 largely protrudes toward the downstream side in relation to the movable ring 41. The strut 5 is attached to the portion protruding toward the downstream side. The strut 5 connects the outer peripheral surface of the inner peripheral ring body 42 and the inner peripheral surface 1B of the duct 1. A plurality of the struts 5 are arranged at intervals in the circumferential direction to extend radially. That is, the inner peripheral ring body 42 is supported inside the flow path P by these struts 5.

The inner peripheral surface of the inner peripheral ring body 42 is formed as a ring inner peripheral surface 42A. The radial dimension of the ring inner peripheral surface 42A is set to be constant over the entire area in the direction of the axis Ac. A space surrounded by the ring inner peripheral surface 42A is formed as an air flow passage F. When operating the propulsion device 100, an air flow flowing in the direction of the axis Ac is formed in the air flow passage F. The air flow passage F has a circular cross-sectional shape when viewed from the upstream side.

Here, when the radial dimension of the ring inner peripheral surface 42A is indicated by d1 and the radial dimension of the inner peripheral surface 1B of the duct 1 is indicated by d2, the value of d1/d2 is set to 0.2 or more and 0.5 or less. More preferably, the value of d1/d2 is set to 0.27 or more and 0.35 or less. Most preferably, the value of d1/d2 is set to 0.3.

The upstream end portion of the inner peripheral ring body 42 is provided with the front end member 43. The front end member 43 is formed in an annular shape centered on the axis Ac and protrudes in a curved shape that is convex toward the upstream side. In other words, the front end member 43 has a streamlined shape in which the resistance to the air flow is suppressed when viewed from the upstream side. The outer peripheral surface of the front end member 43 is flush with the outer peripheral surface of the movable ring 41. Similarly, the inner peripheral surface of the front end member 43 is flush with the ring inner peripheral surface 42A.

The cover 44 is attached to a position which corresponds to the outer peripheral surface of the inner peripheral ring body 42 and is located on the downstream side in relation to the inner bearing 6. The cover 44 covers the inner bearing 6 and the movable ring 41 from the downstream side. The cover 44 includes an inclined surface 44A which extends radially inward as it goes from the upstream side toward the downstream side. Since air flows along the inclined surface 44A from the upstream side, the formation of a vortex between the outer peripheral surface of the movable ring 41 and the outer peripheral surface of the inner peripheral ring body 42 is suppressed.

The downstream end portion of the inner peripheral ring body 42 is provided with the rear end member 45. The rear end member 45 is formed in an annular shape centered on the axis Ac and protrudes in a curved shape that is convex toward the downstream side. The outer peripheral surface of the rear end member 45 is flush with the outer peripheral surface of the inner peripheral ring body 42. Similarly, the inner peripheral surface of the rear end member 45 is flush with the ring inner peripheral surface 42A.

Additionally, as described above, when the radial dimension of the ring inner peripheral surface 42A is indicated by d1 and the radial dimension of the inner peripheral surface 1B of the duct 1 is indicated by d2, the value of d1/d2 is set to 0.2 or more and 0.5 or less. More preferably, the value of d1/d2 is set to 0.27 or more and 0.35 or less. Most preferably, the value of d1/d2 is set to 0.3. Here, the thrust (generated propulsion force) in the radially inner region of the fan blade 3 becomes smaller than that in the radially outer region thereof and thus the torque necessary for rotating the fan blade 3 becomes smaller. Further, the thrust/torque ratio in the radially inner region becomes smaller than that in the radially outer region. That is, since the work obtained in the radially inner region of the fan blade 3 is small, it is not always efficient to increase the blade length of the fan blade 3 in order to decrease the value of d1/d2 and there is an optimum value for the value of d1/d2. In this embodiment, as an example of such an optimum value, an optimum value set to 0.2 or more and 0.5 or less (preferably 0.3) is shown.

(Operation and Effect)

Next, the operation of the propulsion device 100 will be described. When operating the propulsion device 100, electric power is first supplied to the motor 80. By energizing the motor 80, the outer peripheral ring 2, the fan blade 3, and the movable ring 41 rotate together around the axis Ac. Since the fan blade 3 rotates, an air flow is formed from the upstream side toward the downstream side. The propulsion device 100 generates a propulsion force toward the downstream side by the air flow.

At this time, an air flow is also generated in the air flow passage F formed on the inside of the inner peripheral ring 4. This flow is generated by accompanying the flow with the air flow generated around the fan blade 3 based on the viscosity of the air. Accordingly, an air flow having a flow velocity equivalent to that of the air flow flowing around the fan blade 3 is formed inside the air flow passage F. That is, since the air flow passage F is provided, the mass flow rate of the air passing through the duct 1 increases.

Here, the mass flow rate of the air passing through the flow path P of the duct 1 is indicated by dm/dt. Additionally, the value of the mass flow rate is the product of the air density, the opening area of the flow path P, and the air flow velocity. When an increase in air flow velocity due to the air passing through the flow path P is indicated by Δv, the thrust (propulsion force) is given by T=(dm/dt)·Δv. Further, power p necessary for generating the thrust is expressed as below.

$$p = T \cdot V_0 + \frac{1}{2} \cdot T \cdot \Delta v = T \cdot V_0 + \frac{1}{2} \cdot \frac{T^2}{(dm/dt)} \qquad (1)$$

However, $V_0$ is the flow velocity of the air flowing into the flow path P. From the above formula (1), it can be seen that the second term on the right side can be decreased if the mass flow rate dm/dt can be increased. That is, the power p required to generate certain thrust can be decreased. In other words, less power is required per unit thrust. That is, it is possible to improve the propulsion efficiency T/p.

According to the above-described configuration, the air flow passage F is formed inside the inner peripheral ring 4 (the inner peripheral ring body 42). Accordingly, a part of the air flow flowing in the direction of the axis Ac due to the rotation of the fan blade 3 is viscously carried to pass through the air flow passage F. Thus, the mass flow rate of the air inside the duct 1 increases. As a result, as described based on the above formula (1), the required power per unit thrust is decreased and the propulsion efficiency can be increased. Further, since the air flow passage F is formed, the air resistance due to the inner peripheral ring 4 is decreased and the propulsion force of the propulsion device 100 can be improved. On the other hand, in the conventional method, since a motor or the like is built in a hub, the air flow passage F cannot be formed and air resistance is caused. In the propulsion device 100 according to this embodiment, such air resistance is suppressed.

Further, according to the above-described configuration, since the air flow passage F has a circular cross-sectional shape, a part of the air flow generated by the rotation of the fan blade 3 can be smoothly and stably guided from the entire area in the circumferential direction into the air flow passage F.

Further, according to the above-described configuration, the radial dimension of the air flow passage F is set to be constant over the entire area in the direction of the axis Ac. That is, no step or throttle is formed in the air flow passage F. Accordingly, it is possible to minimize the generation of the pressure loss in the air flow passage F. As a result, it is possible to further increase the mass flow rate of the air passing through the propulsion device 100.

Additionally, according to the above-described configuration, the front end member 43 is provided on the end surface of the inner peripheral ring 4 (the inner peripheral ring body 42). Since the upstream end surface of the front end member 43 protrudes in a curved shape, it is possible to further decrease the resistance to the air flow flowing from the upstream side. Accordingly, it is possible to further increase the propulsion force of the propulsion device 100.

As described above, the first embodiment of the present disclosure has been described. Additionally, it is possible to make various changes and modifications to the above-described configuration without departing from the gist of the present disclosure. For example, the strut 5 described in the above-described embodiment can be made to function as a stationary blade. In this case, the strut 5 can function as a stationary blade by forming the cross-sectional shape of the strut 5 in the radial direction as an airfoil. According to this configuration, it is possible to rectify the air flow flowing from the duct 1 by the strut 5. As a result, since the air flow becomes smooth, it is possible to further improve the propulsion force of the propulsion device 100.

Second Embodiment

Figure 4:
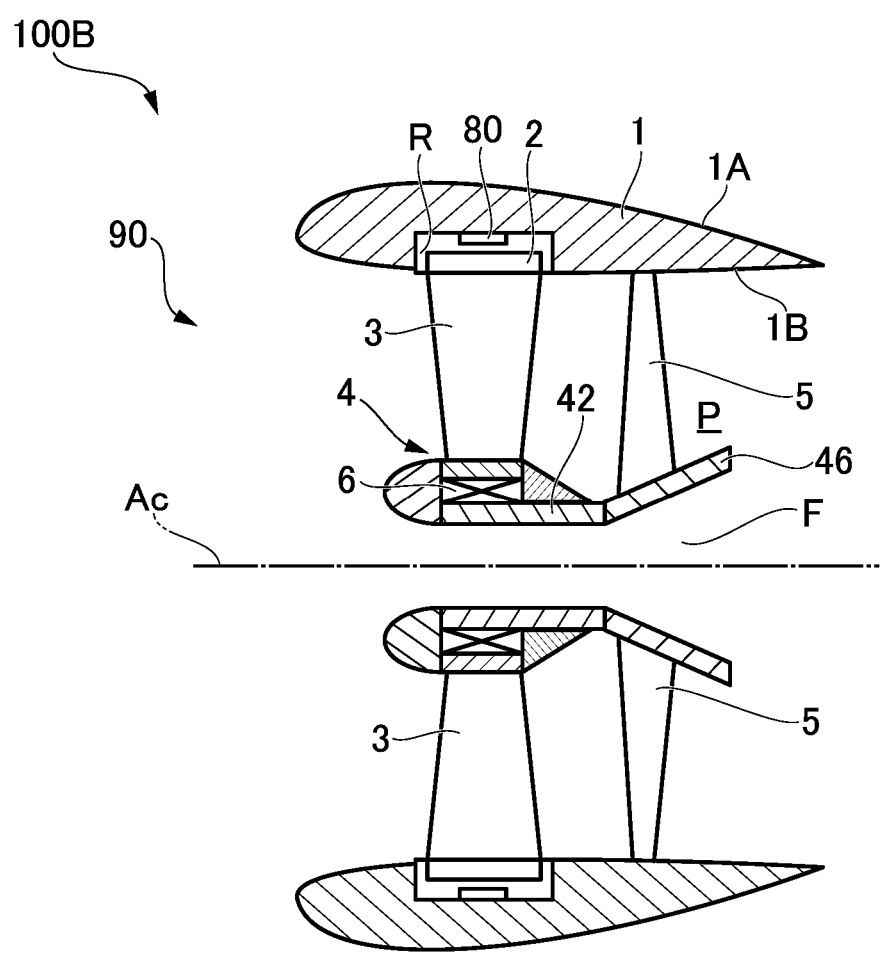
FIG. 4 is a cross-sectional view showing a configuration of a propulsion device according to a second embodiment of the present disclosure.

Next, a propulsion device 100B according to a second embodiment of the present disclosure will be described with reference to FIG. 4. Additionally, the same components as those of the first embodiment are designated by the same reference numerals, and a detailed description thereof will be omitted. As shown in FIG. 4, in this embodiment, the configuration of the inner peripheral ring 4 is different from that of the first embodiment. Specifically, in this embodiment, a diameter expanding member 46 is provided on the downstream side of the inner peripheral ring body 42. The diameter expanding member 46 is formed in a tubular shape centered on the axis Ac and the radial dimension of the inner peripheral surface thereof gradually expands as it goes from the upstream side toward the downstream side. A space on the inner peripheral side of the diameter expanding member 46 constitutes a part of the air flow passage F. That is, a part on the downstream side of the air flow passage F is formed in a diffuser shape by the diameter expanding member 46. Further, the strut 5 connects the outer peripheral surface of the diameter expanding member 46 and the inner peripheral surface 1B of the duct 1.

According to the above-described configuration, the radial dimension gradually expands toward the downstream side in a part on the downstream side of the air flow passage F. Accordingly, the effect as the diffuser is exhibited inside the air flow passage F and the flow rate of the air flowing through the air flow passage F can be increased. As a result, it is possible to further increase the mass flow rate of the air inside the duct 1. Thus, it is possible to further improve the propulsion efficiency of the propulsion device 100.

As described above, the second embodiment of the present disclosure has been described. Additionally, it is possible to make various changes and modifications to the above-described configuration without departing from the gist of the present disclosure. For example, in the above-described second embodiment, an example in which the diameter expanding member 46 is provided on the downstream side of the inner peripheral ring body 42 has been described. However, the entire inner peripheral surface of the inner peripheral ring body 42 can be formed to gradually increase the diameter toward the downstream side similarly to the diameter expanding member 46. According to this configuration, since the performance as the diffuser is further improved, it is possible to further improve the propulsion efficiency of the propulsion device 100.

Third Embodiment

Figure 5:
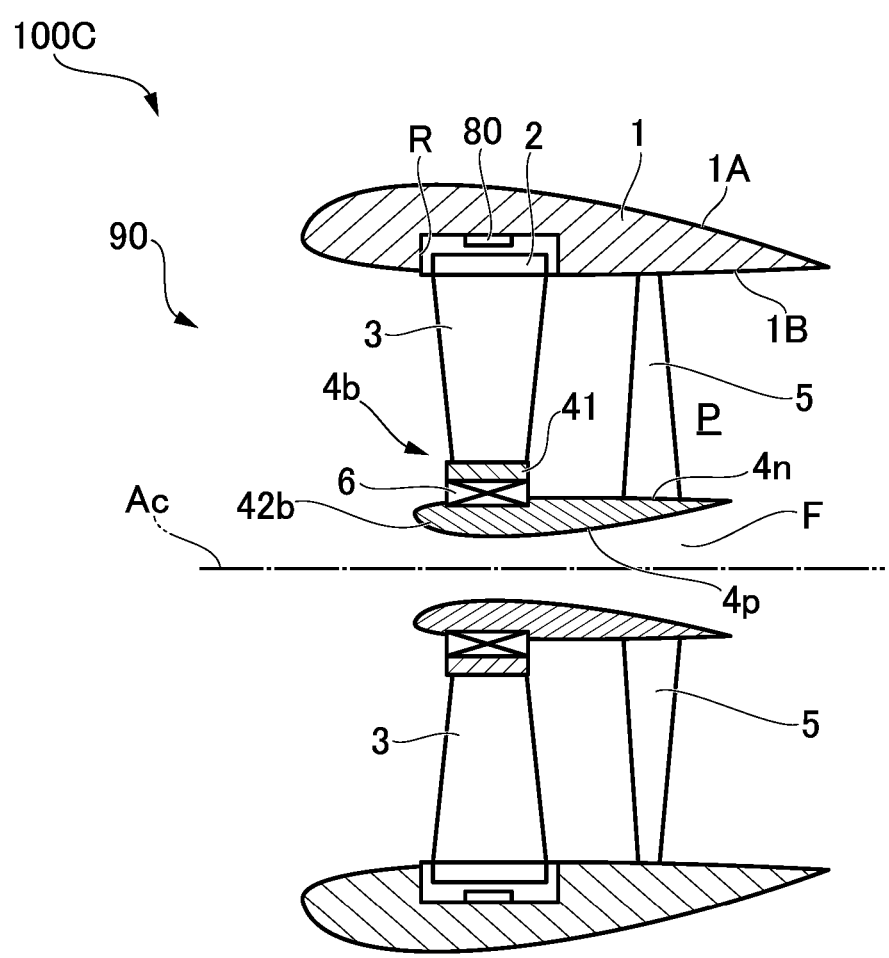
FIG. 5 is a cross-sectional view showing a configuration of a propulsion device according to a third embodiment of the present disclosure.

Next, a propulsion device 100C according to a third embodiment of the present disclosure will be described with reference to FIG. 5. Additionally, the same components as those of the above-described embodiments are designated by the same reference numerals, and a detailed description thereof will be omitted. As shown in FIG. 5, in this embodiment, the shape of an inner peripheral ring body 42b is different from those of the above-described embodiments. The inner peripheral ring body 42b according to this embodiment is formed in a tubular shape centered on the axis Ac and the cross-sectional shape including the axis Ac is formed as an airfoil. In other words, in the inner peripheral ring body 42b, the upstream end portion is formed as a front edge protruding in a curved shape toward the upstream side and the downstream end portion is formed as a rear edge protruding a pointed shape toward the downstream side.

Further, the inner peripheral surface of the inner peripheral ring body 42b protrudes radially inward in a curved shape to be a back surface 4p of an airfoil. The outer peripheral surface of the inner peripheral ring body 42b is formed as a ventral surface 4n of the airfoil. Further, the front end member 43 and the rear end member 45 described in the above-described first embodiment are not provided. Additionally, as shown in FIG. 5, the ventral surface 4n may slightly protrude radially outward in a curved shape or may be recessed radially inward in a curved shape.

According to the above-described configuration, since the inner peripheral ring body 42b has an airfoil cross-sectional shape, the flow velocity of air increases along the airfoil. Specifically, the air that collides with the inner peripheral ring body 42b from the upstream side flows toward the downstream side while being divided into the side of the back surface 4p and the side of the ventral surface 4n. At this time, since the path length of the back surface 4p is longer than that of the ventral surface 4n, the air flow velocity on the side of the back surface 4p increases. Accordingly, since the flow velocity of the air flowing through the air flow passage F increases, it is possible to further improve the propulsion force of the propulsion device 100.

As described above, the third embodiment of the present disclosure has been described. Additionally, it is possible to make various changes and modifications to the above-described configuration without departing from the gist of the present disclosure.

Fourth Embodiment

Figure 6:
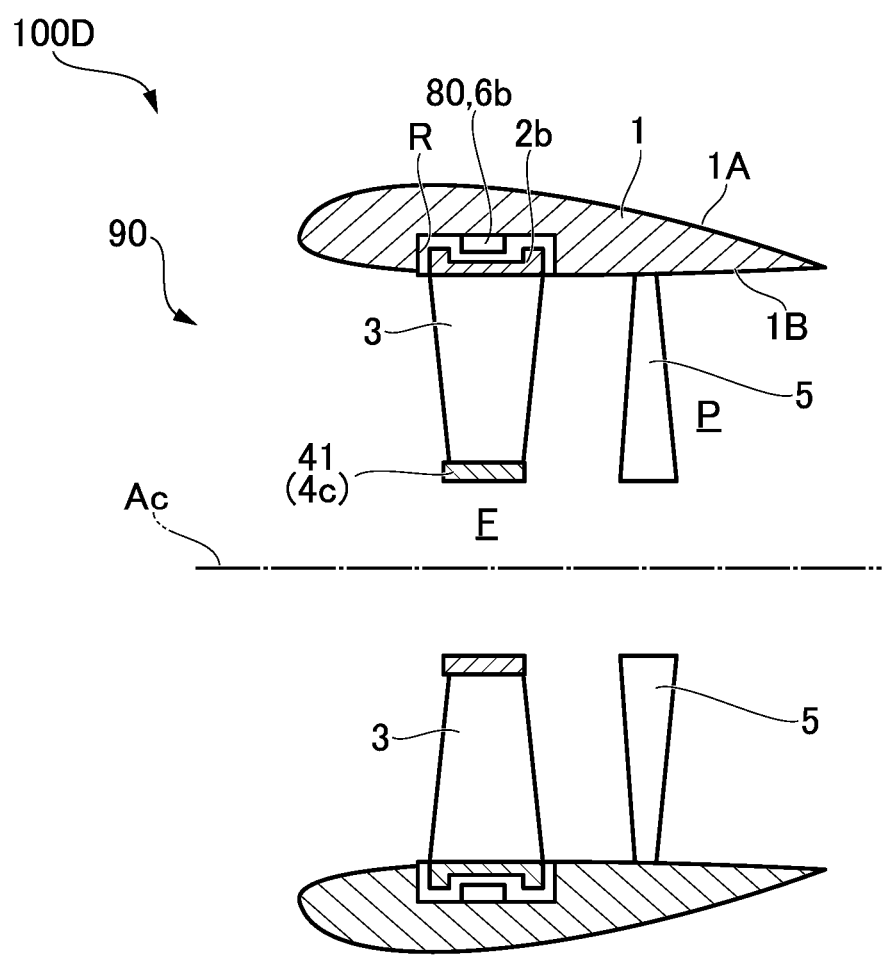
FIG. 6 is a cross-sectional view showing a configuration of a propulsion device according to a fourth embodiment of the present disclosure.

Next, a propulsion device 100D according to a fourth embodiment of the present disclosure will be described with reference to FIGS. 6 and 7. Additionally, the same components as those of the above-described embodiments are designated by the same reference numerals, and a detailed description thereof will be omitted. As shown in FIG. 6, in this embodiment, the configuration of an inner peripheral ring 4c and the configuration of an outer peripheral ring 2b are different from those of the above-described embodiments. Further, in this embodiment, an outer bearing 6b is provided instead of the inner bearing 6.

The inner peripheral ring 4c includes only the movable ring 41 described in the above-described first embodiment. A space on the inner peripheral side of the movable ring 41 is formed as the air flow passage F. The movable ring 41 supports the radially inner end portions of the plurality of fan blades 3 from the radial inside. The outer peripheral ring 2b is supported by the outer bearing 6b to be relatively rotatable with respect to the duct 1. Further, the outer peripheral ring 2b is made rotatable around the axis Ac by the motor 80 provided in parallel to the outer bearing 6b.

Figure 7:
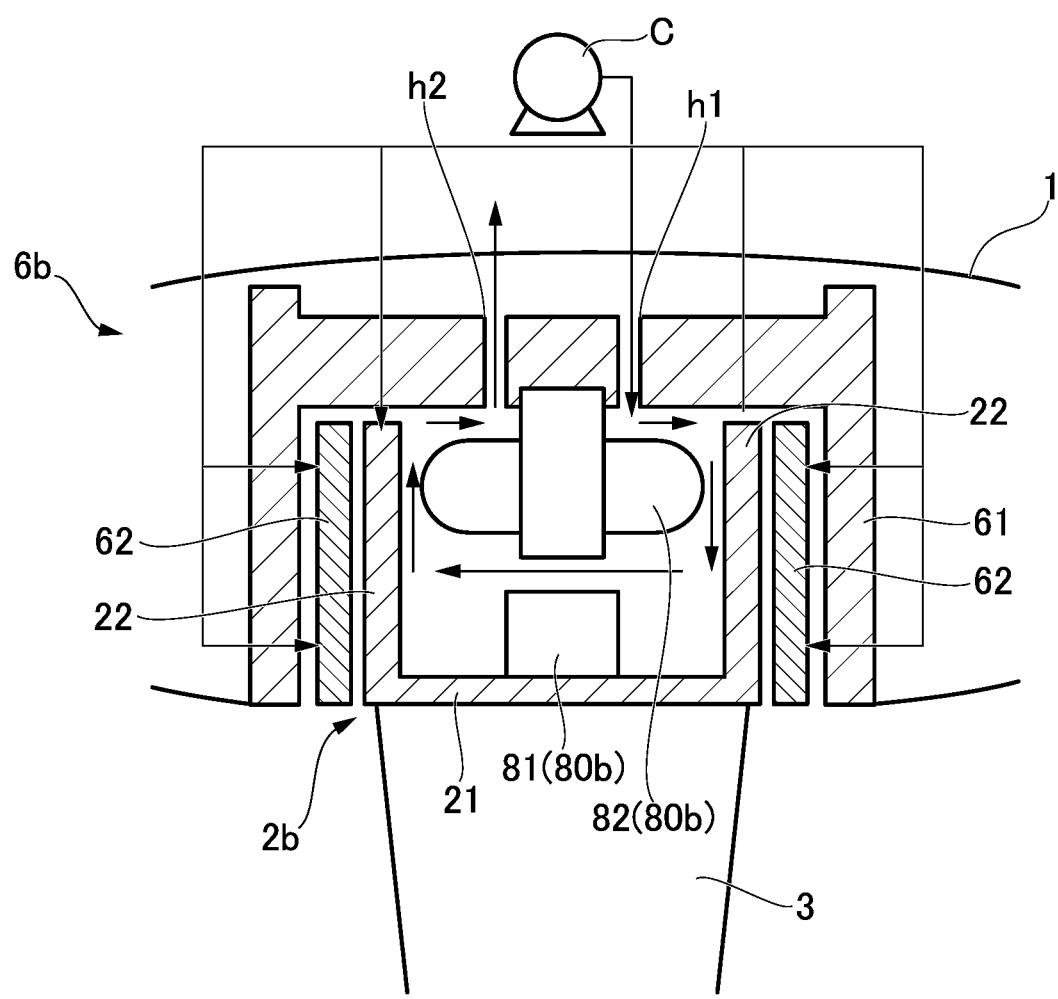
FIG. 7 is a schematic view showing a configuration of an outer bearing according to the fourth embodiment of the present disclosure.

As shown in FIG. 7, the outer peripheral ring 2b includes a tubular outer peripheral ring body 21 centered on the axis Ac and a pair of protrusion portions 22. The pair of protrusion portions 22 are formed in an annular shape that protrudes radially outward from both side edges of the outer peripheral ring body 21 in the direction of the axis Ac. A rotor core 81 is provided on the outer peripheral surface of the outer peripheral ring body 21. This rotor core 81 constitutes a motor 80b together with a stator core 82 provided in a housing 61 to be described later.

The outer bearing 6b includes a compressor C, the housing 61, and a spiral bearing 62. The compressor C compresses air taken in from the outside to generate high-pressure air and introduces the air into the housing 61. The housing 61 covers the outer peripheral ring 2b from both the radial direction and the direction of the axis Ac. The housing 61 is provided with an air inlet h into which compressed air guided from the compressor C is introduced and an air outlet h2 which discharges air. The spiral bearing 62 is provided between the inner wall of the housing 61 and the protrusion portion 22 of the outer peripheral ring 2b. Further, the stator core 82 is provided in a portion facing the rotor core 81 in the inner peripheral surface of the housing 61.

The compressed air flows from the air inlet h1 into the housing 61 while the compressor C being driven. This compressed air flows radially inward along the inner surface of the protrusion portion 22 and then passes through a gap between the rotor core 81 and the stator core 82. This air flow forms an air bearing between the outer peripheral ring 2b and the housing 61. This air bearing functions as a journal bearing that bears a radial load applied to the outer peripheral ring 2b. The air passing between the rotor core 81 and the stator core 82 flows radially outward along the opposite protrusion portion 22 and is discharged from the air outlet h2 to the outside.

On the other hand, the air generated by the compressor C is also supplied to the region between the spiral bearing 62 and the housing 61. The spiral bearing 62 supports the protrusion portion 22 to be displaceable from both sides in the direction of the axis Ac by the air. That is, the spiral bearing 62 functions as a thrust bearing that bears a load applied to the outer peripheral ring 2b in the direction of the axis Ac.

Additionally, in this embodiment, the strut 5 is supported in a cantilever manner by the inner peripheral surface 1B of the duct 1. However, it is also possible to adopt a configuration in which the radially inner end portions of the struts 5 are connected to each other.

According to the above-described configuration, since the outer peripheral ring 2b is supported by the outer bearing 6b, the inner peripheral ring 4c and the fan blade 3 can be integrally formed with each other. Accordingly, it is possible to omit the bearing device (that is, the inner bearing 6 described in each of the above-described embodiments) between the inner peripheral ring 4c and the fan blade 3. As a result, it is possible to further expand the opening diameter of the inner peripheral ring 4c (the air flow passage F) and to further increase the mass flow rate of air. As a result, it is possible to further improve the propulsion efficiency of the propulsion device 100.

Further, in this embodiment, since the above-described air bearing is used as the outer bearing, it is possible to reduce the weight of the entire device compared to, for example, a case of using other sliding bearings or rolling bearings. Therefore, when applying the propulsion device 100 to an aircraft, it is possible to suppress an increase in the weight of the entire aircraft and provide an aircraft that is lightweight and has a high fuel consumption rate.

As described above, the fourth embodiment of the present disclosure has been described. Additionally, it is possible to make various changes and modifications to the above-described configuration without departing from the gist of the present disclosure. For example, in the above-described embodiments, an example in which the air bearing is used as the outer bearing 6b has been described. However, the aspect of the outer bearing 6b is not limited to the air bearing and a sliding bearing or a rolling bearing can be used depending on the design and specifications.

APPENDIX

The propulsion device 100 of each embodiment is understood, for example, as below.

(1) The propulsion device 100 according to a first aspect includes: the duct 1 in which the flow path P extending in the direction of the axis Ac is formed; the fan 90 which is provided with a) the outer peripheral ring 2 formed in an annular shape surrounding the axis Ac and installed to be relatively rotatable around the axis Ac with respect to the duct 1, b) the plurality of fan blades 3 arranged at intervals in the circumferential direction such that each blade is extend from the outer peripheral ring 2 toward the inside of the flow path P. and c) the inner peripheral ring 4 formed in an annular shape being connected the radially inner end portions of the plurality of fan blades 3 and in which the air flow passage F is formed so that air flows therethrough in the direction of the axis Ac; and the motor 80 which is configured to drive the fan 90 to rotate around the axis Ac.

According to the above-described configuration, the air flow passage F is formed inside the inner peripheral ring 4. Accordingly, a part of the air flow flowing in the direction of the axis Ac due to the rotation of the fan blade 3 is viscously carried to pass through the air flow passage F. Thus, the mass flow rate of the air inside the duct 1 increases. As a result, the required power per unit thrust is decreased and the propulsion efficiency can be increased. Further, since the air flow passage F is formed, the air resistance due to the inner peripheral ring 4 is decreased and the propulsion force of the propulsion device 100 can be improved.

(2) In the propulsion device 100 according to a second aspect, the air flow passage F may have a circular cross-sectional shape when viewed from a first side in the direction of the axis Ac.

According to the above-described configuration, since the air flow passage F has a circular cross-sectional shape, a part of the air flow generated by the rotation of the fan blade 3 can be smoothly and stably guided from the entire area in the circumferential direction into the air flow passage F.

(3) In the propulsion device 100 according to a third aspect, the radial dimension of the air flow passage F may be constant from the first side toward a second side in the direction of the axis Ac.

According to the above-described configuration, since the radial dimension of the air flow passage F is constant over the entire area in the direction of the axis Ac, it is possible to minimize the pressure loss in the air flow passage F.

(4) In the propulsion device 100 according to a fourth aspect, the radial dimension of the air flow passage F may be gradually expanded from the first side toward the second side in the direction of the axis Ac.

According to the above-described configuration, the radial dimension of the air flow passage F is gradually expanded to the second side in the direction of the axis Ac. Accordingly, the effect as the diffuser is exhibited inside the air flow passage F and the flow rate of the air flowing through the air flow passage F can be increased. As a result, it is possible to further increase the mass flow rate of the air inside the duct 1.

(5) In the propulsion device 100 according to a fifth aspect, the inner peripheral ring 4 may have an airfoil cross-sectional shape extending from the first side toward the second side in the direction of the axis Ac in a cross-sectional view including the axis Ac.

According to the above-described configuration, since the inner peripheral ring 4 has the airfoil cross-sectional shape, the flow velocity of the air increases along the airfoil. Accordingly, since the flow velocity of the air flowing through the air flow passage F increases, it is possible to further improve the propulsion force.

(6) In the propulsion device 100 according to a sixth aspect, an end surface of the inner peripheral ring 4 at the first side in the direction of the axis Ac may be protruded in a curved shape toward the first side.

According to the above-described configuration, since the end surface of the inner peripheral ring 4 protrudes in a curved shape, it is possible to further decrease the resistance to the air flow flowing from the first side in the direction of the axis Ac.

(7) The propulsion device 100 according to a seventh aspect may further include the outer bearing 6b supporting the outer peripheral ring 2b to be rotatable with respect to the duct 1.

According to the above-described configuration, since the outer peripheral ring 2b is supported by the outer bearing 6b, the inner peripheral ring 4c and the fan blade 3 can be integrally formed with each other. Accordingly, it is possible to omit the bearing device between the inner peripheral ring 4c and the fan blade 3. As a result, it is possible to further expand the opening diameter of the inner peripheral ring 4c (the air flow passage F) and to further increase the mass flow rate of air.

EXPLANATION OF REFERENCES 100, 100B, 100C, 100D Propulsion device
1 Duct
1A Outer peripheral surface
1B Inner peripheral surface
2, 2b Outer peripheral ring
3 Fan blade
4, 4b, 4c Inner peripheral ring
4n Ventral surface
4p Back surface
5 Strut
6 Inner bearing 6b Outer bearing
41 Movable ring
42, 42b Inner peripheral ring body
43 Front end member
44 Cover
44A Inclined surface
45 Rear end member
46 Diameter expanding member
Ac Axis
F Air flow passage
P Flow path
R Concave portion
80, 80b Motor
90 Fan

What is claimed is:

1. A propulsion device comprising:
a duct in which a flow path extending in a direction of an axis is formed;
a fan which is provided with
a) an outer peripheral ring formed in an annular shape surrounding the axis and installed to be relatively rotatable around the axis with respect to the duct,
b) a plurality of fan blades arranged at intervals in a circumferential direction such that each blade is extended from the outer peripheral ring toward an inside of the flow path, and
c) an inner peripheral ring formed in an annular shape and to which inner end portions of the plurality of fan blades are connected, wherein an air flow passage is formed inside the inner peripheral ring so that air flows therethrough in the direction of the axis;
a motor which is configured to drive the fan to rotate around the axis; and
an outer bearing supporting the outer peripheral ring to be rotatable with respect to the duct,
wherein the outer bearing includes a housing which is provided on the duct and covering the outer peripheral ring, and a compressor which is allowed to introduce compressed air to the housing,
the motor includes a rotor core which is provided on an outer peripheral surface of the outer peripheral ring, and a stator core which is provided on the housing so as to face the rotor core,
the fan is rotatably supported by only the outer bearing, and
wherein an air bearing is formed between the outer peripheral ring and the housing as the outer bearing by introducing the compressed air from the compressor to a gap between the rotor core and the stator core inside the housing.

2. The propulsion device according to claim 1, wherein the air flow passage has a circular cross-sectional shape when viewed from a first side in the direction of the axis.

3. The propulsion device according to claim 2, wherein an inner diameter of the air flow passage is constant from the first side toward a second side in the direction of the axis.

* * * * *